W. L. JOHNSTON.
CAR UNLOADING MACHINE.
APPLICATION FILED MAY 14, 1917.
1,266,273.
Patented May 14, 1918.
3 SHEETS—SHEET 2.
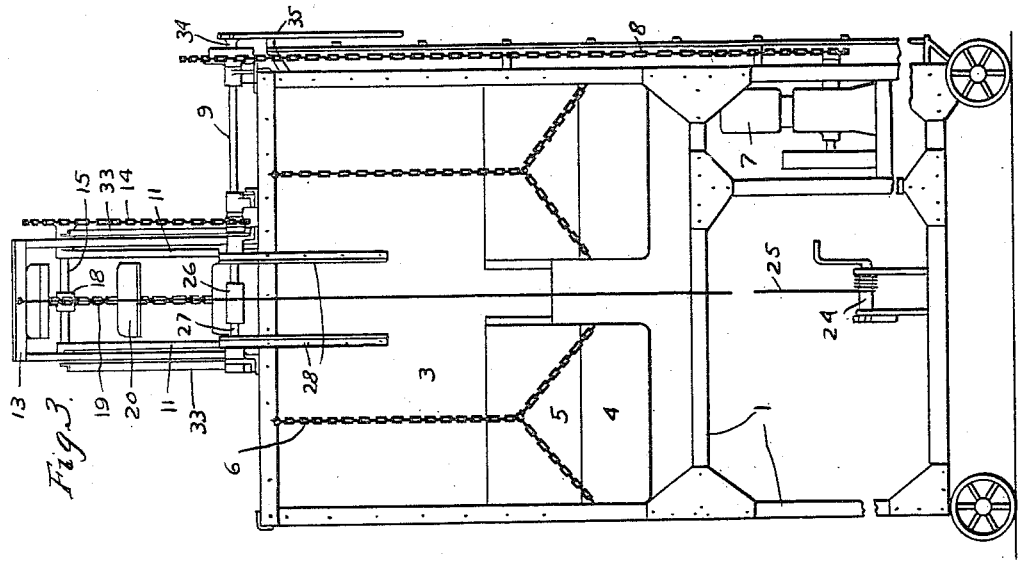
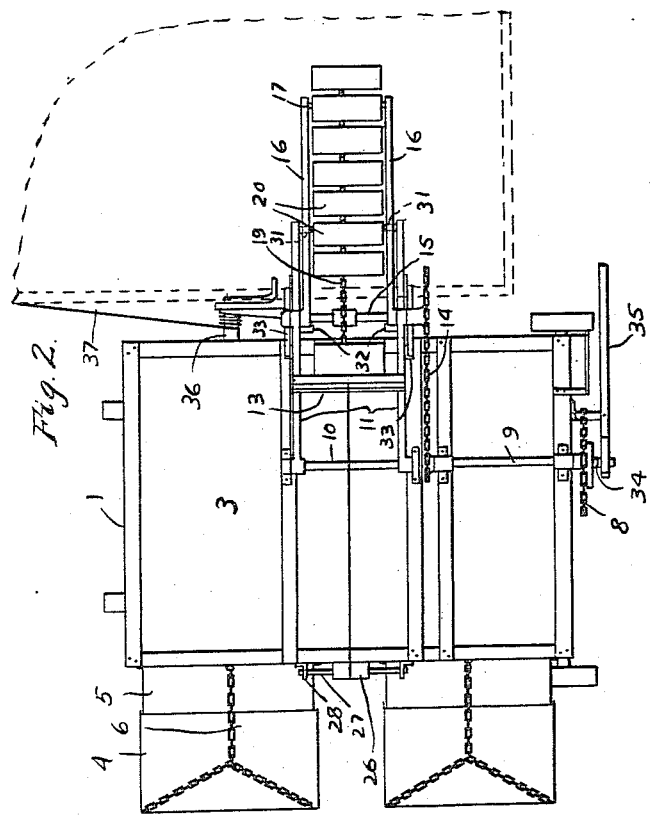
INVENTOR
William L. Johnston
ATTORNEY W. L. JOHNSTON.
CAR UNLOADING MACHINE.
APPLICATION FILED MAY 14, 1917.
1,266,273.
Patented May 14, 1918.
3 SHEETS—SHEET 3.
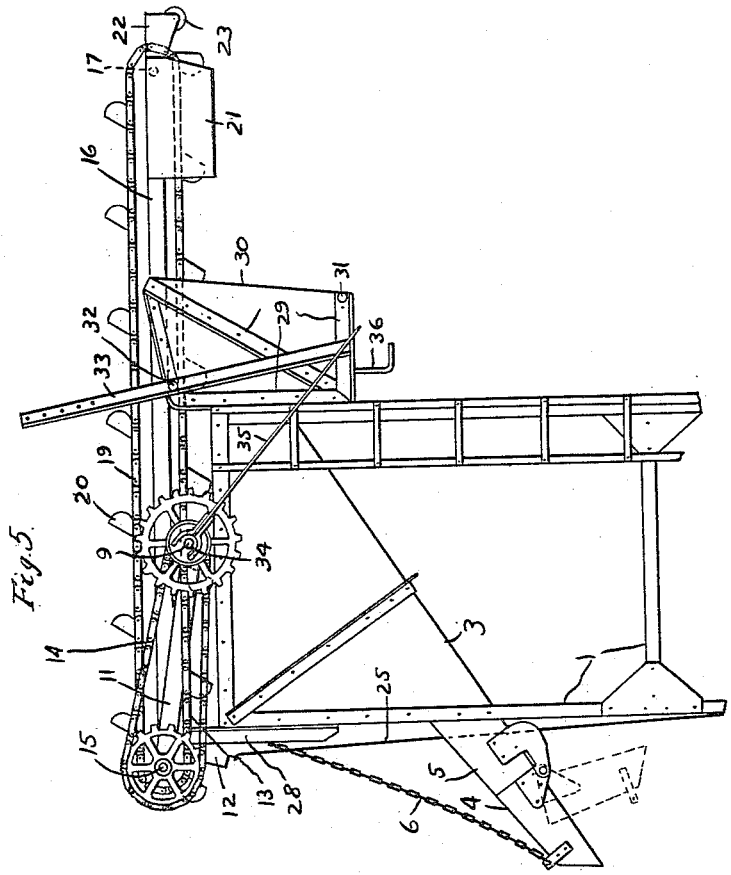
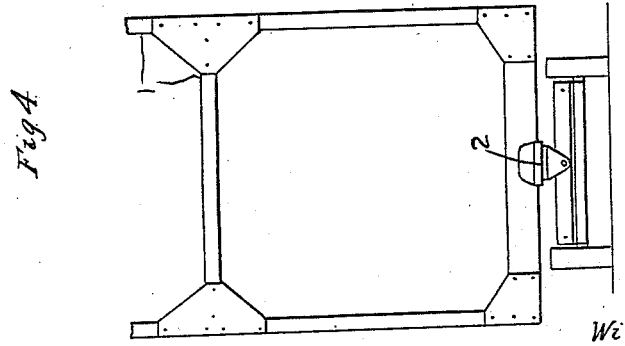
INVENTOR
William L. Johnston.
BY
ATTORNEY

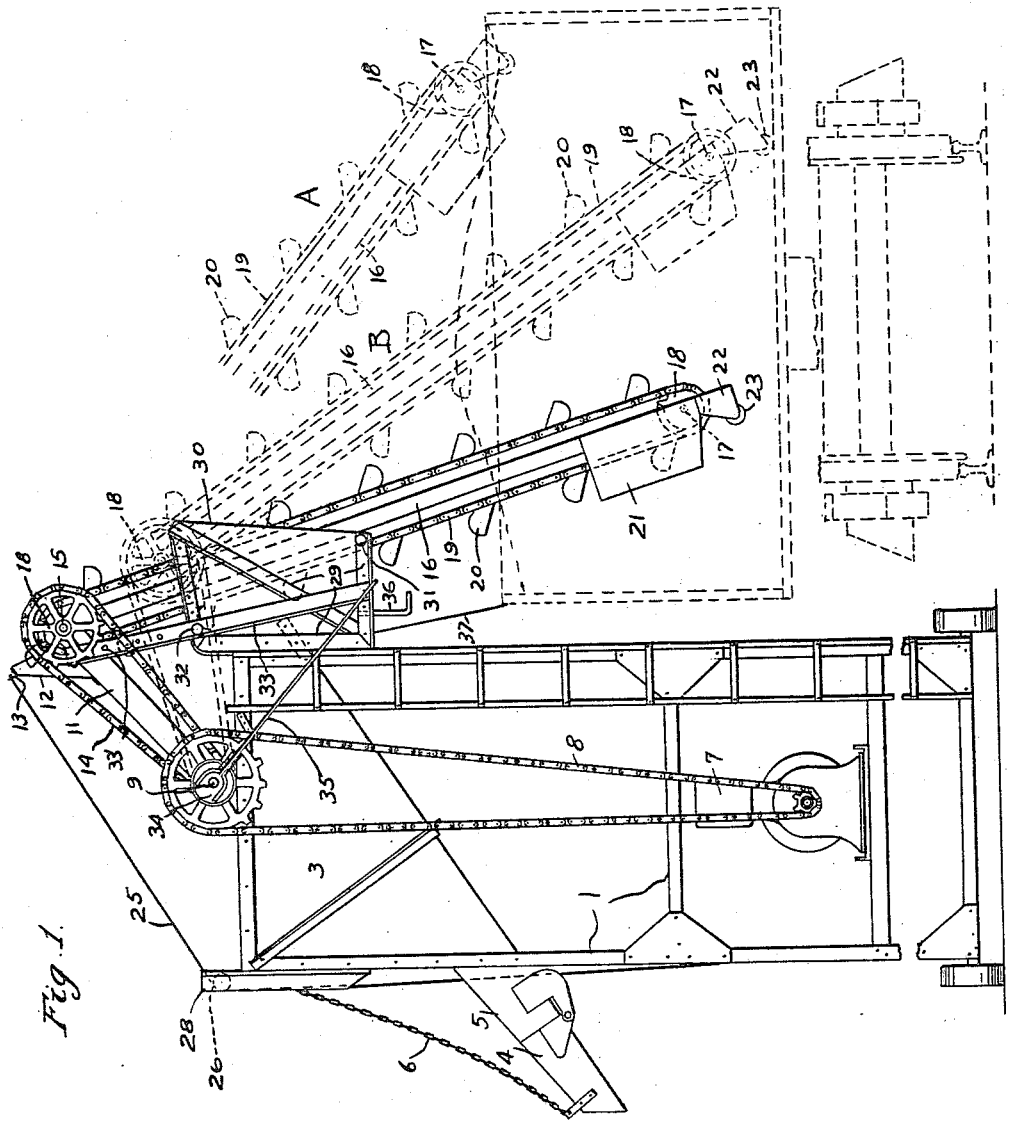

UNITED STATES PATENT OFFICE.

WILLIAM L. JOHNSTON, OF LANSING, MICHIGAN.

CAR-UNLOADING MACHINE.

1,266,273.

Specification of Letters Patent. Patented May 14, 1918.

Application filed May 14, 1917. Serial No. 168,342.

*To all whom it may concern:*

Be it known that I, WILLIAM L. JOHNSTON, a citizen of the United States, residing at Lansing, in the county of Ingham and State of Michigan, have invented a new and useful Car-Unloading Machine, of which the following is a specification.

This invention relates to car unloaders, and particularly to portable car unloaders employing adjustable conveyers.

The object of the invention is primarily to provide a car unloading machine having a conveyer which will automatically work down as the depth of the material upon which it rests is reduced, and which will be manually adjustable to various working positions so that it may reach and remove all of the material in a car.

Another object lies in providing for adjustment of the conveyer to an elevated position, where it will rest securely upon the frame, when the machine is not in use, and where it will not interfere with movement of the machine to a location close adjacent to a car of material.

A further object is to provide convenient means for manually actuating travel of the machine along side of a car so as to shift its working location.

In attaining these and other objects the invention embodies certain novel features of the construction described in the following specification and illustrated in the accompanying drawing, wherein, Figure 1 is a rear view in elevation of the car unloading machine in position for operation, showing the conveyer in one of its working positions with relation to a carload of material, the car and two other working positions of the conveyer being shown in dash lines.

Fig. 2 is a top view of the machine in the position of Fig. 1.

Fig. 3 is a view of the discharge side of the machine.

Fig. 4 is a front view of the lower portion of the supporting frame showing the swivel mounting of the same upon the front axle.

Fig. 5 is a rear view of the upper portion of the machine showing the horizontal position occupied by the conveyer when not in use.

Referring to the parts of the device by the reference characters applied to the same in the several views of the drawings, the numeral 1 designates a wheeled rectangular upright frame, formed preferably of trussed angle bars, and having the front wheels adapted to turn by a suitable swivel connection 2 between the axle thereof and the base of the frame. Within the top portion of said frame, there is rigidly mounted an open-topped hopper 3 having its bottom inclined and provided with one or more discharge spouts each formed with hingedly connected parts 4 and 5 and held normally alined by a chain 6 extended upwardly and connected to the frame.

The lower portion of the frame 1 carries an engine 7 (or other source of motive power) and a chain belt 8 establishes a driving connection between said engine and a countershaft 9 journaled upon the top of said frame. A pivot shaft 10, journaled in alinement with the shaft 9, forms a support for one end of a swinging frame or link, comprising a pair of spaced bars 11 and an angle bar 13 rigidly extended between brackets 12 mounted in opposed relation upon said bars adjacent their free ends. From the shaft 9 a chain belt 14 establishes a driving connection with a shaft 15 journaled in the free ends of the bars 11, and this shaft forms the pivotal connection for one end of a swinging conveyer frame, which comprises a pair of spaced relatively long bars 16, and a shaft 17 connecting the free ends of said bars. The shafts 15 and 17 respectively carry sprocket wheels 18, upon which a conveyer chain 19 is mounted, and buckets 20 for conveying the material from the car to the hopper are arranged at suitable intervals upon said chain. To the extremity of each bar 16 a guard plate 21 is secured, said plates projecting beyond the side of the conveyer chain carrying the empty buckets, and being adapted to prevent the material from flowing into the space between the adjacent sprocket wheel 18 and the portion of the chain 19 approaching said wheel, and thus possibly clogging or breaking the chain. Brackets 22 project also from the free ends of the bars 16 and carry rollers 23 which hold the conveyer out of contact with the car bottom when the former is adjusted to such a working position as is shown at B in Fig. 1.

The conveyer is adapted to be manually shifted between any of its various positions by means of a windlass 24 mounted as shown in Fig. 3 upon the frame 1, and a cable 25 extending from said windlass to the bar 13 and intermediately passing over a roller 26 supported above the discharge side of the unloader upon a shaft 27 mounted in uprights 28 fastened to the frame. When the conveyer is in its position of disuse (see Fig. 5) the free ends of the bars 11 rest respectively upon the projecting upper ends of said uprights 28. At the loading side of the machine, two supplementary frames are secured to the frame 1, each comprising a number of angle bars 29 and a plate 30 secured to said bars. These frames are adapted to project above the car which is being unloaded (see Fig. 1) and the conveyer occupies a position between the same. A pair of opposed rollers 31 are mounted in said frames and engage the bars 16 of the conveyer, limiting swinging movement of the latter toward the main frame, and forming pivotal supports upon which the conveyer frame travels when being raised to its horizontal position. Said supplementary frames furthermore carry a pair of opposed rollers 32 which engage the bars 16 to support the conveyer frame in its horizontal position of disuse, and when moving to and from said position. (See Fig. 5). To the supplementary frames 29, there is further secured an opposed pair of upright angle bars 33 which project at an incline above the main frame and are each formed with a row of apertures in their upper portions to selectively receive opposed pins 33′ which will be adapted to support the bars 11 in various angular positions of the same to establish corresponding fixed axes about which the conveyer will be adjustable.

A suitable clutch 34, controlled by a lever 35, is mounted upon the shaft 9 and is adapted to establish a releasable driving connection through the chain 8 with the engine, so that the transmission of power from the engine to the conveyer may be regulated.

As a provision for effecting travel of the machine longitudinally of the side of a car, a windlass 36 is mounted upon the frame 1 at the loading side of the machine, and the cable 37 of said windlass is adapted to be secured to the side of the car some distance in advance of the machine. Thus when the windlass is actuated to take up the cable the machine will undergo a corresponding forward displacement.

From the foregoing description it will be apparent that no manual adjustment of the conveyer is necessary from the time of its engagement with the top of a load of material, as at A in Fig. 1, to the time of its contact with the car bottom, as at B in the same figure. After having worked its way down through the material, the conveyer will be adjusted to a new position of engagement with the top of the pile and allowed to again work down.

The provision of the hopper 3 is an important feature, since it permits the conveyer to continue the unloading operation during intervals when no wagons or other receptacles are beneath the discharge spouts.

Obviously the device is not limited to the application of unloading cars, but may be used wherever a quantity of material, such as crushed stone, coal, sand and the like, is to be elevated and discharged into containers.

What I claim is:

1. In a device of the character described, the combination with a frame, of a conveyer, a swinging link connecting the conveyer to said frame, means for driving the conveyer independently of the movement of said link, means engaging said link for adjusting the conveyer between a position surmounting the frame and a working position at one side of the frame, and upper and lower members for supporting the conveyer during its adjustment, respectively functioning while the conveyer is adjacent its raised and lowered positions.

2. In a device of the character described, the combination with a frame, of a conveyer, a swinging link connecting the conveyer to said frame, means for driving the conveyer independently of the movement of said link, means engaging said link for adjusting the conveyer between a position surmounting said frame and a working position at one side of the frame, a supplementary frame laterally projecting from the main frame, means carried by the supplementary frame for supporting the conveyer during adjustment between its elevated and lowered positions, and means carried by the supplementary frame engageable with said link to support the same in various positions of angular adjustment.

In testimony whereof I sign this specification.

WILLIAM L. JOHNSTON.